Jan. 15, 1963  J. C. WILSON ETAL  3,073,446
MACHINE FOR PROCESSING ELECTRICAL COMPONENTS
Filed Nov. 29, 1960  9 Sheets-Sheet 1

FIG. I.

INVENTOR
James C. Wilson &
Albert W. Zemek

BY *Franklin D. Wolffe*
ATTORNEY

Jan. 15, 1963  J. C. WILSON ETAL  3,073,446
MACHINE FOR PROCESSING ELECTRICAL COMPONENTS
Filed Nov. 29, 1960  9 Sheets-Sheet 2
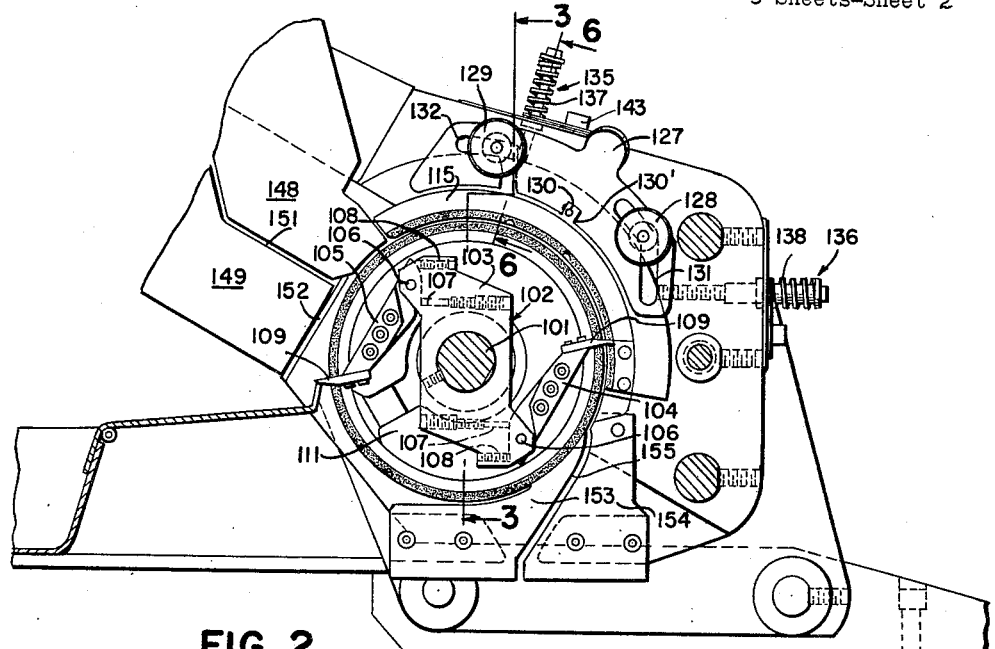
FIG. 2.
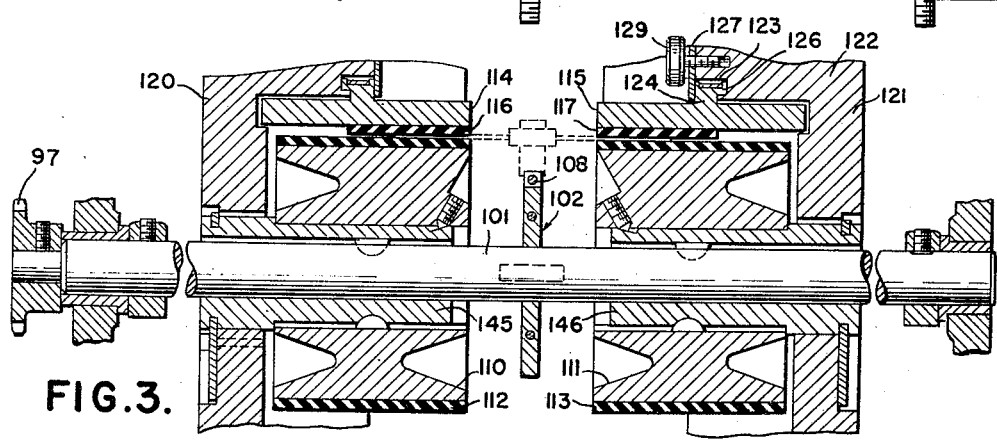
FIG. 3.
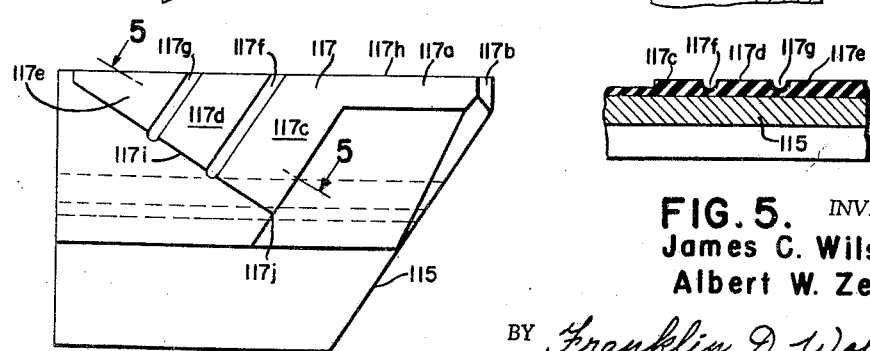
FIG. 4.
FIG. 5.
INVENTOR
James C. Wilson &
Albert W. Zemek
BY Franklin D. Wolfe
ATTORNEY INVENTOR
James C. Wilson &
Albert W. Zemek
BY Franklin D. Wolffe
ATTORNEY INVENTOR
James C. Wilson &
Albert W. Zemek BY Franklin D. Wolfe
ATTORNEY INVENTOR
James C. Wilson &
Albert W. Zemek BY Franklin D. Wolffe
ATTORNEY INVENTOR
James C. Wilson &
Albert W. Zemek BY Franklin D. Wolffe
ATTORNEY United States Patent Office 3,073,446
Patented Jan. 15, 1963

3,073,446
MACHINE FOR PROCESSING ELECTRICAL COMPONENTS
James C. Wilson, Port Dickenson, and Albert W. Zemek, Binghamton, N.Y., assignors to Universal Instruments Corporation, Binghamton, N.Y., a corporation of New York
Filed Nov. 29, 1960, Ser. No. 72,405
19 Claims. (Cl. 209—81)

The present invention relates to a machine for processing electrical components, particularly components having a central generally cylindrical body and two oppositely extending lead wires, the machine more particularly providing for straightening the leads of the component, thereafter, testing the components, and properly orienting those components having an electrical orientation or polarity, and thereafter assembling a plurality of the components in a tape-and-component belt.

Electrical components, such as resistors, diodes, capacitors (including electrolytic capacitors), are commonly mass produced and have the physical characteristics of a central cylindrical body and a lead extending axially from each end of the body. These are known as axial lead components, and the leads are usually bent or curved during the manufacturing process. Some components, such as diodes, have a given resistance or impedance value when a voltage is impressed across them in one direction, but have a different resistance value when the voltage is impressed in the opposite direction. This is called component polarity. It is desirable that the manufacturer of the component suitably package them in such a form that they may be readily stored and/or shipped to the consuming or using organization. The package of components should provide for uniformity of assembly with respect to their electrical orientation, should have their leads extend substantially axially of the central cylindrical bodies, and should permit the ready utilization of the resistors, including their easy disassembly from the package combination. While resistors have been herein specifically mentioned, other components may be of the same general nature, for example, electrolytic capacitors and capacitors where "outer foil lead" is a consideration offer similar problems. Hence, it will be understood that the problems noted in connection with orientatable resistors will be found in other components, and indeed in other units.

It is a general object of the present invention to provide a machine that will meet all of the above desideratum.

A more specific object of the present invention is the provision of a machine which will straighten the leads of electrical components, test the electrical components for orientation and value and while reorienting components as necessary, will reject those of improper resistance value, and will then assemble the components in series in combination with adhesive tape.

Another object of the present invention is to provide a machine for straightening the leads of axial lead components which machine will operate rapidly and without danger of jamming.

A further object of the present invention is the provision of a machine for straightening leads of axial lead components having an improved lead straightening pair of cooperating elements.

A still further object of the present invention is to provide a lead straightening machine in which a shoe of a drum-and-shoe pair may be quickly and readily adjusted in order to straighten the leads of components having leads of varying diameters.

Another object of the present invention is the provision of a machine for testing electrical components for their electrical value, and for accepting and rejecting components in accordance with the test.

Yet another object of the present invention is to provide a machine for testing electrical components for their electrical value, and also for the electrical orientation or polarity of the components, and to properly orient all of the components passing in and through the machine which are of acceptable electrical value.

A further object of the present invention is the provision of an electrical component electrical testing machine having the above desideratum, and which will operate at a high rate of speed.

Yet another object of the present invention is to provide a testing unit or machine which will cycle components to a testing station and effect a test thereof, the timing of the test cycle being in accordance with the individual components being tested.

A still further object of the present invention is to provide a machine for straightening the leads, testing and orienting, and taping electrical components, which machine is made up of a plurality of sub-assemblies which may be readily assembled into a complete machine, or used independently.

Other objects and the nature and advantages of the present invention will be apparent from the following description taken in conjunction with the accompanying drawings, wherein:

FIG. 2 is a central, vertical cross-sectional view of the lead straightener of FIG. 1.

FIG. 3 is a cross-sectional view taken on the line 3—3 of FIG. 2.

FIG. 4 is a developmental view of a shoe element of the lead straightener shown in FIGS. 2 and 3.

FIG. 5 is a cross-section taken on line 5—5 of FIG. 4.

*General Arrangement*

Figure 1:
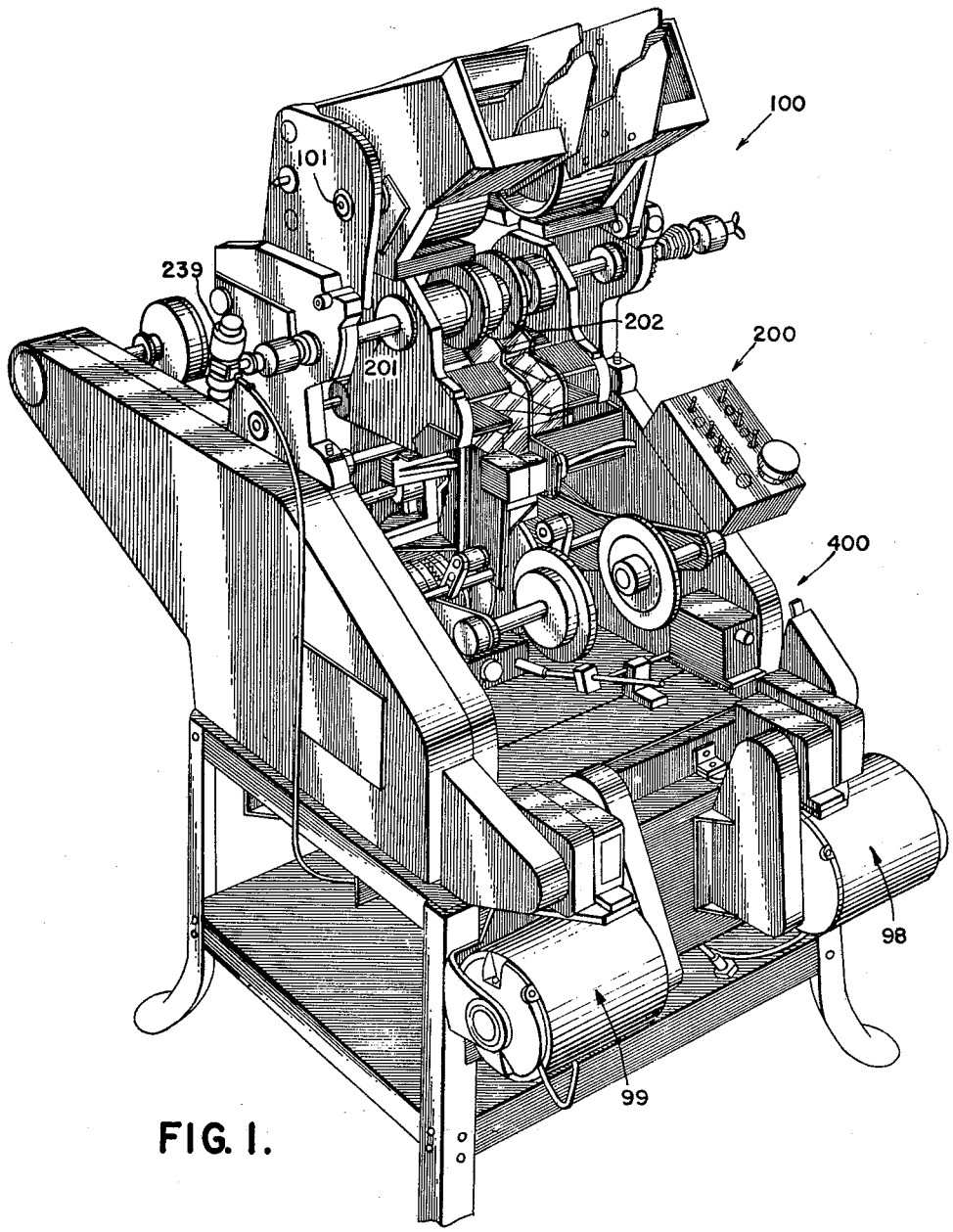
FIG. 1 is a perspective view of a machine for straightening the leads, orienting and testing, and taping axial electrical components.

The machine in accordance with the present invention processes coaxial lead components which are characterized by having a cylindrical central body and leads extending from the opposite ends of this central body, and at the central part of these ends. These leads, are in fact, metal wires which may become bent and curved during fabrication of the components. The machine of the present invention has a lead straightener 100 (see FIG. 1) driven by motor 98 and adapted for unbending and straightening the leads extending from the opposite ends of the component central body, and for causing the axis of the leads to be in line with the axis of the central body. After the leads have been straightened in the lead straightener, the components are fed into a rotary tester and orienter 200 or a jaw type tester and orienter 300 (as shown in FIGS. 10–15). When the electrical components are manufactured, they do not have a uniform predetermined value, and in the case of diode resistors and electrolytic capacitors, the components have a polarity. By this is meant the characteristic of the components in having a certain resistance when voltage is impressed across in one direction, but having a different resistance when voltage is impressed across in the opposite direction. Thus, either tester and orienter of the present invention tests each component to determine that it is or is not in an acceptable range, and also tests the component for electrical orientation, and reverses those components in the wrong orientation. Each tester and orienter accepts randomly oriented, good and bad components, and passes rejects out to a reject tray and passes acceptable, properly and uniformly oriented components out of an exit passageway. From the tester and orienter, the components are passed to a taping machine 400 driven by motor 99 and adapted to apply a pair of oppositely facing tapes to the bodies or to the leads of the components and the adhesive tape, and this belt is suitably wound on a drum or reel.

The Lead Straightener

The lead straightener 100 has fed to it components which have their leads curved or bent, so that the leads do not lie along extensions of the axis of the central body. These components are moved into position by pick-up fingers and arms, which contact the central body, and place the oppositely extending leads between a pair of spaced drums and a pair of juxtaposed shoes. The friction betwen the shoes and the rotating drums causes the components to rotate, and this action straightens the leads, as will be more fully described hereinbelow.

Referring now to FIGS. 2 and 3, there may be seen in FIG. 2 a shaft 101 having secured to it a pick-up arm assembly 102 comprising a plate 103 which carries a pair of pick-up arms 104, 105. Each of these pick-up arms 104, 105 is secured to the plate 103 by a pivot 106, the pick-up arms also being acted on by spring urged fingers 107 and being restrained by stops 108, which are on opposite sides of the pivot 106. It will be understood that the construction of the two arms 104 and 105 is the same. At the end of pick-up arm 104 is a finger 109 which engages the central body of the component.

As may be seen from FIG. 3, the shaft 101, having a driving sprocket 97 keyed thereto, has the pick-up assembly 102 at approximately the mid-portion thereof, while to either side of the assembly 102 there are a pair of drums 110, 111. The drums 110, and 111 are slidably secured to shaft 101, and have on their outer surfaces shells 112 and 113 of a suitable friction material. Cooperating with the drums 110 and 111 are a pair of shoes 114 and 115, which are provided with suitable contact surfaces 116 and 117. There are provided also a pair of side plates 120, and 121 which support the shaft 101 and the shoes 114, 115. Since the two sides of the machine are reversely identical, one side only will be described. Side plate 121 has an inward extension 122 with an arcuate groove 123 concentric with shaft 101. Shoe 115 has a rib 124 with an extension 126, which latter rides in the groove 123. By this construction, the shoe may be circumferentially adjusted. It will be noted that the back of shoe 115 does not contact the underside of extension 122, but instead is spaced from it.

The shoe 115 is retained in the groove 123 and in proper axial relationship to the drum by the adjusting plate 127, which latter is secured to the side plate 121 by the two thumb screws 128, 129. Adjusting plate 127 has angled slots 131, 132 to permit its positioning in varied locations; i.e. axially with respect to the drums 110 and 111 and also circumferentially with respect to plate 148, to be referred to hereinbelow. A dowel 130 extends from the shoe 115 and is received in a notch 130' in the plate 127, to thereby effect circumferential movement of the shoe by the plate.

Figures 6, 7, 8:
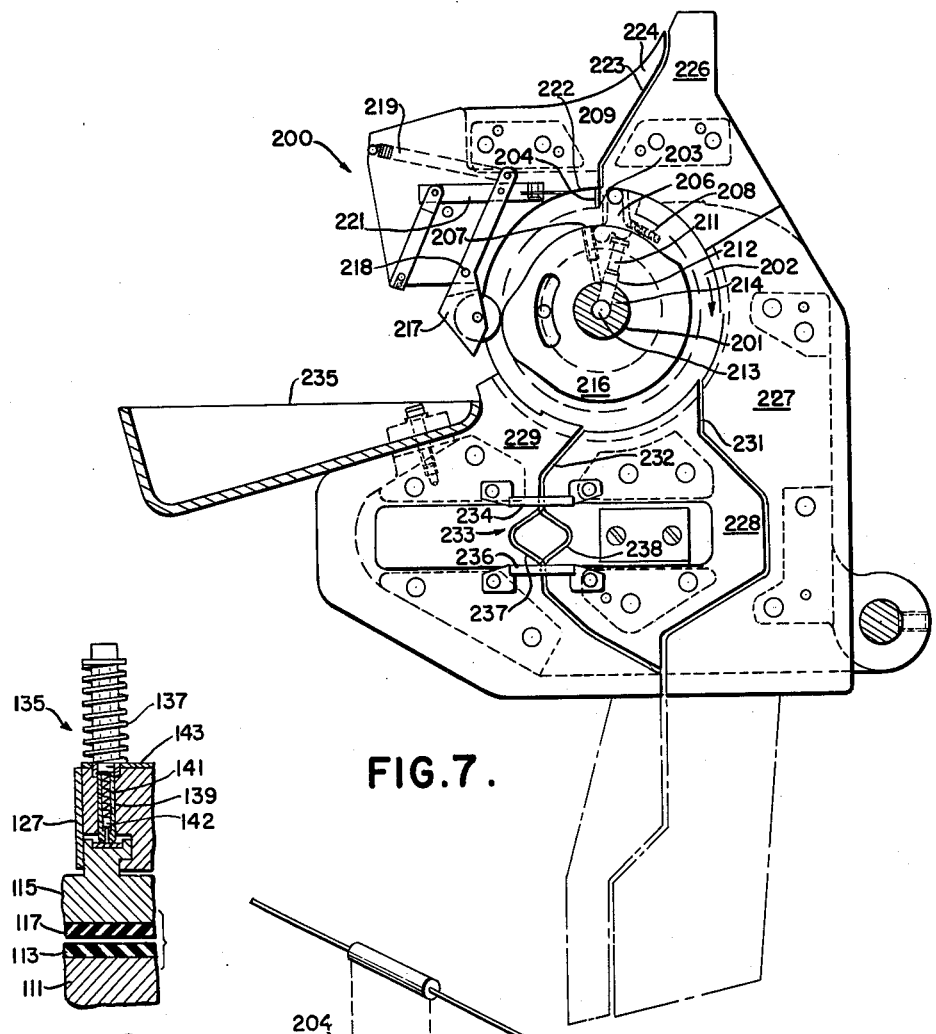
FIG. 6 is a cross-section taken on line 6—6 of FIG. 2.
FIG. 7 is a cross-sectional view of a rotary component tester and orienter.
FIG. 8 is a perspective view of parts of the rotary tester and orienter of FIG. 7.

The shoe 115 (and shoe 114) is urged toward its mating drum by an upper pressure adjusting screw 135 and a lower pressure adjusting screw 136, these screws being outwardly urged by encircling springs 137, 138. As is seen in FIG. 6, upper pressure adjusting screw 135 has a lower threaded body 139 which is hollow and receives a spring 141 and a stepped diameter pin 142, pin 142 being urged against shoe 115 by spring 141. The lower end of body 139 is peened over, so that pin 142 extends therefrom but may not escape from body 139.

The upper end of screw 135 is polygonal, and carries a pointer 143 to give an indication of the adjustment of the screw.

The two adjusting screws 135, 136 may be positioned as desired in order to provide yielding abutments for the shoe 115, to thereby permit adjustment of the spring pressure acting on the shoe and urging it towards the mating drum. By properly adjusting the screws 135, 136, the pressure on the lead of the component may be adjusted to thereby obtain optimum straightening.

The contact surfaces 112 and 113 of the drums 110 and 111 are cylindrical and unbroken; the contact surfaces 116 and 117 of shoes 114 and 115 are specially configured in order to provide, in cooperation with surfaces 112 and 113, improved lead straightening action. To this end, reference is had to FIG. 4 in which the developed view of shoe 115 discloses a relatively long and narrow entrance land 117a, with a preceding forward part 117b which provides an initial greater lead-in clearance. Rearwardly of land 117a, surface 117 broadens into a land 117c which extends diagonally rearwardly, there being succeeding lands 117d and 117e which extend parallel to land 117c. The lands 117c, 117d, and 117e are separated by the grooves 117f and 117g, which may also be seen in FIG. 5.

The several lands will be seen to have a common side margin 117h, and an inclined margin 117i which define an angle between them. Margin 117i is located, for a particular shoe, so that the point 117j is the distance equal to the length of a lead to be straightened from the margin 117h, to thus provide for optimum lead straightening.

It has been found to be critically important to the operation of the lead straightener that the land 117a must be at least one-third the total circumferential length of the lands of the surface 117, and that unless this ratio exists, the lead straightener is liable to malfunction, either through failure to straighten the leads of all the components passing through the lead straightener or due to jamming of the straightener.

The contact surfaces of the shoes and drums are made of an artificial composition similar to leather or artificial soles in density, resiliency and coefficient of friction.

The operaton of the shoe 115 and drum 111 will be to first engage the portion of the lead closest to the component, due to the shape and position of land 117a, the leads being between the rotating drums and the shoe surfaces. As the lead is rotated between the shoe and drum, and moves from the beginning of land 117c to almost the end thereof, the entire lead comes under pressure tending to provide straightening along its entire length. However, because the lead resists the pressure of the shoe and roller, when the end of the lead passes the extreme lateral extent of land 117c, there is a certain amount of "sweep back," by which is meant that the lead is at an angle to the axis of the body. This is corrected by the angle or taper of the remote boundary of lands 117c and 117d. This is really the actual straightening process. The grooves 117f and 117g assist in removing the "sweep back," and they appear to exert a force along the axis of the component in the direction of the end of the lead although there is no certainty of the actual physical action of these grooves. Empirically, it is known that the lead will not be straightened without at least one groove.

The side plates 120 and 121 may be suitably mounted on guide rods so that they may be moved towards or away from each other to thereby provide for the straightening of the leads of components having different lengths of the central body. As will be understood from the above discussion, the side plates 120 and 121 will carry the shoes 114 and 115 with them, and as will be seen from FIG. 3, will carry the sleeves 145 and 146 which are keyed to the shaft 101 and to which are keyed the drums 110 and 111.

Referring again to FIG. 2, it may be seen that there are provided an upper guide plate 148 and a lower guide plate 149 which are spaced apart to provide between them a channel 151 which receives at its upper end a lead of an electrical component. A second pair of similar plates (not shown) receive the opposite lead, and the component is thereby guided downwardly along the channel 151 to the end thereof, where it is held by a leaf spring 152 which is suitably secured to the lower plate 149 and which extends across the channel 151.

At the rearward end of the shoes there are provided spaced plates 153 and 154, having the outlet channel 159 between them.

In operation, upon rotation of shaft 101 by a driving connection between motor 98 and sprocket 97, the pick-up arm 104 will be caused to rotate so that the finger 109 will engage the central body of the component. It will remove the component from the channel 151, and its corresponding channel, flexing the spring plate 152 and the corresponding spring plate to permit the leads to be extracted. The component will then be caused to move in a generally clockwise manner, as shown in FIG. 2, until the leads thereof engage between the two drums and shoes. From this point, the drums and shoes will move the component through the lead straightener in the manner above described, and the finger 109 and pick-up arm 104 will override the component shortly after the component leads come under pressure between the shoe and drum, and thus the arm 104 will have no real effect insofar as pushing the component through the machine is concerned. In fact, the pick-up arm 104, due to its pivotal mounting and spring urging, may rotate about the pivotal mounting 106 in order to accommodate the actions and movements of the component while its leads are being straightened.

After the leads have been straightened and extend axially of the central body of the component, the component is deposited in the channel 155.

The Tester and Orienter—Rotary

The tester and orienter 200 has electrical components fed to it from the lead straightener 100. The components are first tested, in the case of diodes, for example, for acceptability and orientation, and if found to be satisfactory, are released into a first passageway. If not released, the component is further tested for acceptability and orientation in the opposite direction, and if found to be satisfactory is released into a second passageway and during its travel through that passageway will be rotated end for end, and eventually will be discharged through the same discharge passageway as those components entering the first passageway. Those components which do not have a satisfactory value during either of the two steps or phases of the testing will be deposited in a reject tray, through what may be called a third passageway.

Referring now to FIG. 7, there may be seen a main shaft 201 which carries a disc 202. There are in fact two such discs 202, as may be seen in FIG. 8, these discs being substantially identical so that only one will be described. Disc 202 has a notch 203 adjacent to which is a transversely extending backing and contact plate 204. Mounted in disc 202 is a lever 206, lever 206 being pivotally mounted at 207 and being urged in a clockwise direction about the pivot 207 by spring 208. A jaw 209 of lever 206 may be caused to move against the urging of spring 208 by a piston 211 which is slidable in a hole 212 in the disc 202. The piston 211 may be caused to move outwardly of the axis of shaft 201 by virtue of air under pressure being admitted to a central passage 213 in shaft 201, a connecting passage 214 joining passage 213 to the hole 212.

A cam fixed on the shaft 201 has in engagement with it a cam follower 217 which is pivotally mounted at 218, and which has a spring 219 connected with the upper end thereof to constantly urge it against the cam 216. The cam follower 217 has pivotally secured to it, a gate support member 221 which carries a gate 222. Gate 222 extends across a passageway 223 which is defined by the space between plates 224 and 226.

Adjacent to the periphery of disc 202 are the plates 227, 228, and 229, these being generally at the lower or bottom part of the disc 202. Between plates 227 and 228 is a first passageway 231, and between plates 228 and 229 is a second passageway 232. Passageway 231 extends in a generally downward direction, as does the passageway 232, and as will be seen the passageway 232 eventually joins the first passageway 231. However, in passageway 232 is a device for rotating the electrical components in an end for end manner through 180°, this rotating device being designated 233. Device 233 is made up of upper and lower metal rings 234 and 236 having notches on their inner peripheries and to which are joined two pairs of parallel wires 237 and 238. The pair of wires 237, 238 extend in a generally helical manner through 180°.

As may be seen from FIG. 1, the shaft 201 may have at the end thereof a solenoid operated valve 239 for controlling the admission of air into the axially extending passage 213 from an air hose. The flow of electricity through the leads during the testing phases may occur through suitable contact plates mounted on the shaft 201 and electrically connected with the contact plates 204 and 209 on the two discs 202. A suitable electric circuit will be provided, connected with these contact plates, and including, of course, connections to the solenoid valve 239.

Figure 9:
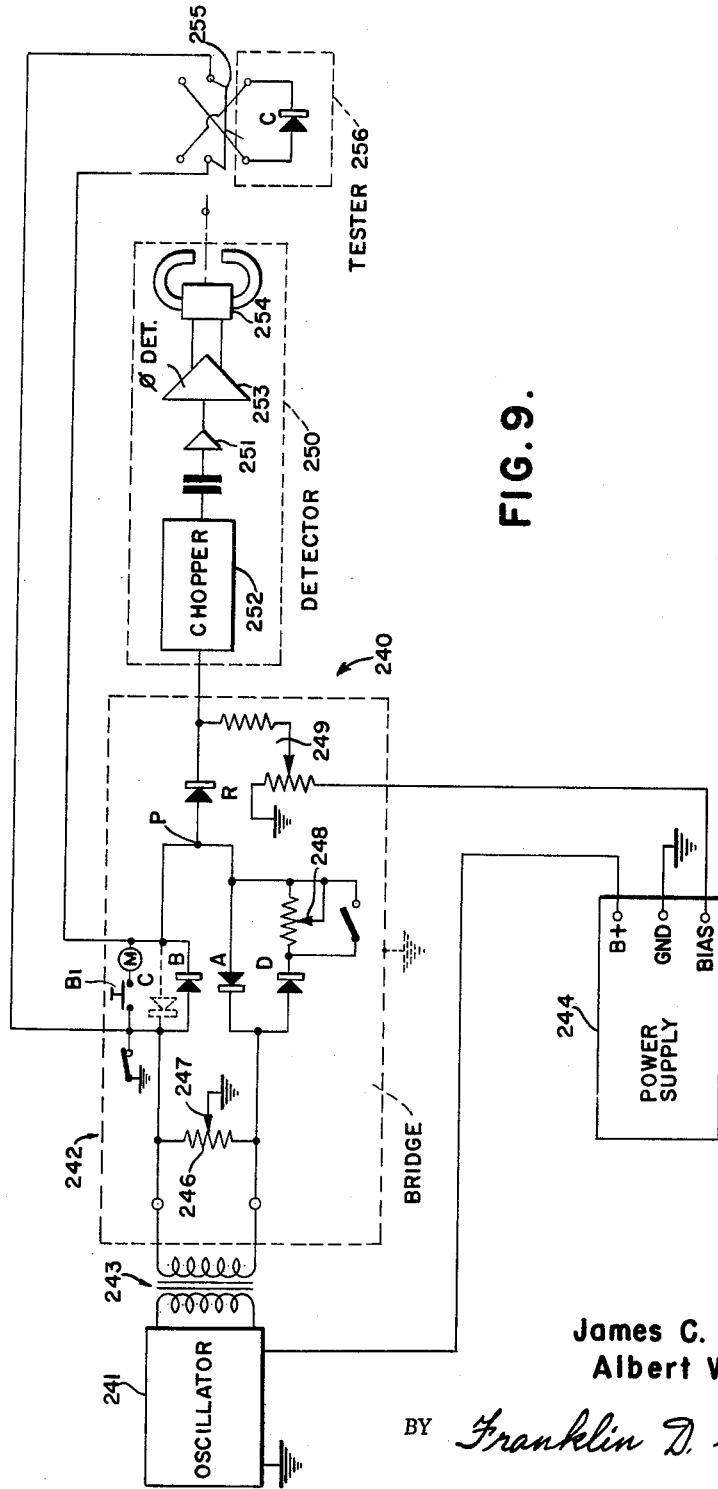
FIG. 9 is a block diagram of a circuit useable with the tester and orienter of FIGS. 7 and 8.

A suitable exemplary circuit is generally shown in FIG. 9, this being a diode forward impedance and electrical orientation comparator which automatically and instantaneously checks for short circuit, open circuit, and electrical orientation, and by comparing the diode under test against a standard, accepts or rejects the diode under test on the basis of not exceeding the standard diode forward impedance.

The comparator circuit 240 consists of a 1000 cycle oscillator 241 connected with an impedance bridge 242 via a transformer 243. The oscillator 241 consists of a push-pull phase shift oscillator with a 180° lattice, and drives a push-pull class $AB_1$ amplifier, generating more than sufficient power for the bridge operation and providing the low impedance signal power output stage source necessary to prevent large variations in signal amplitudes applied to diodes under test. The power supply 244 is a conventional full wave rectified regulated source providing plate, filament, and bias potentials for comparator circuit 240. The bridge 242 itself is comprised of one branch having a potentiometer 246 with a grounded slider 247. At the ends of this branch are connected the other branch, which is the diode test circuit.

The highly sensitive detector 250 is a high gain A.C. amplifier means 251 following a D.C. chopper 252, so that when the bridge is balanced, a D.C. null valve is sensed by the A.C. amplifier means of the detector 250.

The diode circuit is arranged as follows:

There are four diodes lettered A, B, C, and D, the diode C being the diode under test. Considering an arbitrary positive half cycle, it will be evident that diode B conducts on the positive half cycle, and since the opposite end of the transformer 243 is 180° out of phase during this half cycle, diode A conducts on the same positive half cycle, also for equal ratio branches and identical diodes A and B, the output at point P is zero volts. During the subsequent half cycle, diode C will conduct while diode D, connected to the opposite end of transformer 243, will also conduct. In the event that diodes C and D are identical and the bridge has been previously balanced for zero output from diodes A and B, point P will again give zero output.

Because of diode B, the detector 250 requires positive input to initiate rejection or reversal of orientation. In the event that diode C has higher impedance than diode D there will be greater voltage drop across diode C during the second half cycle, resulting in the positive output from diode D having control and rendering point P positive. In the event diode C is open or of reversed orientation, this will result in an extremely positive voltage at P being exclusively derived from diode D during the second half cycle.

With respect to detecting a shorted test diode, it will be apparent that a shorted diode will result in point P having values of alternately positive and negative strong currents during the first and second half cycles to completely override the anti-phase voltage derived from diodes A and D. This results in an A.C. output of the amplifier 251. The detector requires a positive D.C. input for actuation since diode R provides half-wave rectification of this A.C. signal to insure a positive input to the detector.

In the event diode C has a lower forward impedance than diode D, point P will go negative, owing to lesser voltage drop across diode C as compared with diode D, and no operation of the detector will occur.

The meter M serves two functions: (1) to indicate upon a manual closure of pushbutton $B_1$ whether adjustment of the forward voltage of the diode under test is required, which is adjusting by controlling the output of the oscillator; and (2) when switched to balance under calibration to provide a means for initial nulling of the bridge and the two nulling diodes A and B. The deviation control potentiometer 248 has the function of raising the forward impedance of diode D in order to match an initial test sample diode C installed to determine an upper limit of values.

The threshold of the detector may be raised or lowered to desired sensitivity by means of a negative bias voltage under control of potentiometer 249.

The detector 250 may comprise a D.C. chopper input with suitable filtering, followed by stages of A.C. amplification means 251 driving a phase detecting power amplifier 253, in the plate circuit of which is a master control relay 254, which is energized when the chopped D.C. input has the same phase as the internal reference applied to the phase detector—i.e. positive. This relay is equipped with controls to actuate the solenoid valve 241, and switch reversal means 255 in the tester 256 for reversing the connection of the diode under test to the bridge circuit.

In operation, shaft 201 and disc 202 will be caused to rotate in a clock-wise direction, as is indicated by the arrow. The passageway 223 will have a lead of a component therein, and it will be understood that there will be a second passageway 223 defined by similar plates 224 and 226 which are in spaced relation to the plates 224 and 226 shown in FIG. 7. Thus, the leads of a component will extend between these two passageways and the central body of the component will lie between the pairs of plates. As shaft 201 rotates, it will cause the gate 222 to oscillate across the passageway, due to cam 216 and cam follower 217, and consequently at the appropriate time an electrical component will be caused to drop from the passageway 223 so that the leads thereof are deposited into the notches 204 of discs 202. At this time, the lever 206 will not contact the lead of the electrical component, being held in the withdrawn position by the spring 208. After approximately 10° of rotation of the shaft 201 however, air under pressure will be supplied through the hollow passage 213 and will cause the piston 211 to move outwardly to engage lever 206 and overcome the force of spring 208 to thereby cause lever 206 to clamp the lead between it and the backing and contact plate 204. Suitable electric connections may be supplied to the gate 204, it being understood that there are two such plates, and thus current may be caused to flow through the electrical component as above indicated during the rotation of shaft 201 and disc 202. Should the voltage drop across the electrical component be within a predetermined range, a signal will be given and through appropriate mechanism the pressure acting on piston 211 will be relieved just before the lever 206 is opposite passageway 231. Consequently, the electrical component will be released from the disc 202, and will drop into the first passageway 231, from whence it will pass out of the tester and orienter 200. Should a component held in the disc 202 not be of the predetermined value required, the signal will not be given to release the air pressure acting on piston 211, and thus that component will not be dropped. Such a situation could arise either when the component tested has the wrong polarity, i.e., it is "facing" or is oriented in the wrong direction, or it may not pass the test due to its being of the proper polarity but being outside of the predetermined value range. In either case, the component will next be subjected to a voltage in the reverse direction, and if the voltage drop is of the proper value during this second phase of the testing, in which the current flow is in the opposite direction from the first phase, a signal will be given to relieve the air pressure acting on piston 211 and so the component will be released slightly in advance of second passageway 232. It will travel down passageway 232 and the leads thereof will enter into the notches in ring 234 and thence between the spaced wires 237 and 238, and the component will thereby be rotated through 180°, in an end for end manner. It will then enter the second or lower part of the second passageway 232 and will join with those components which were passed down passageway 231. At this point, it will be understood that all of those components in the lower part of passageway 231, below the junction of passageways 231 and 232, will be of the proper value and will be oriented in the same direction. Those components which fail to pass both of the test phases will be carried on beyond the second passageway 232, and a signal will be given to relieve the air pressure acting on piston 211 so that these components may fall into the reject tray 235.

*The Tester and Orienter—Jaw Type*

For the testing of certain components of which capacitors are one example, variable, and sometimes relatively long test times are required. A testing apparatus for each component should, therefore, permit whatever test time is required by the individual component, and this may be either longer or shorter than a standard or fixed time cycle.

Figure 10:
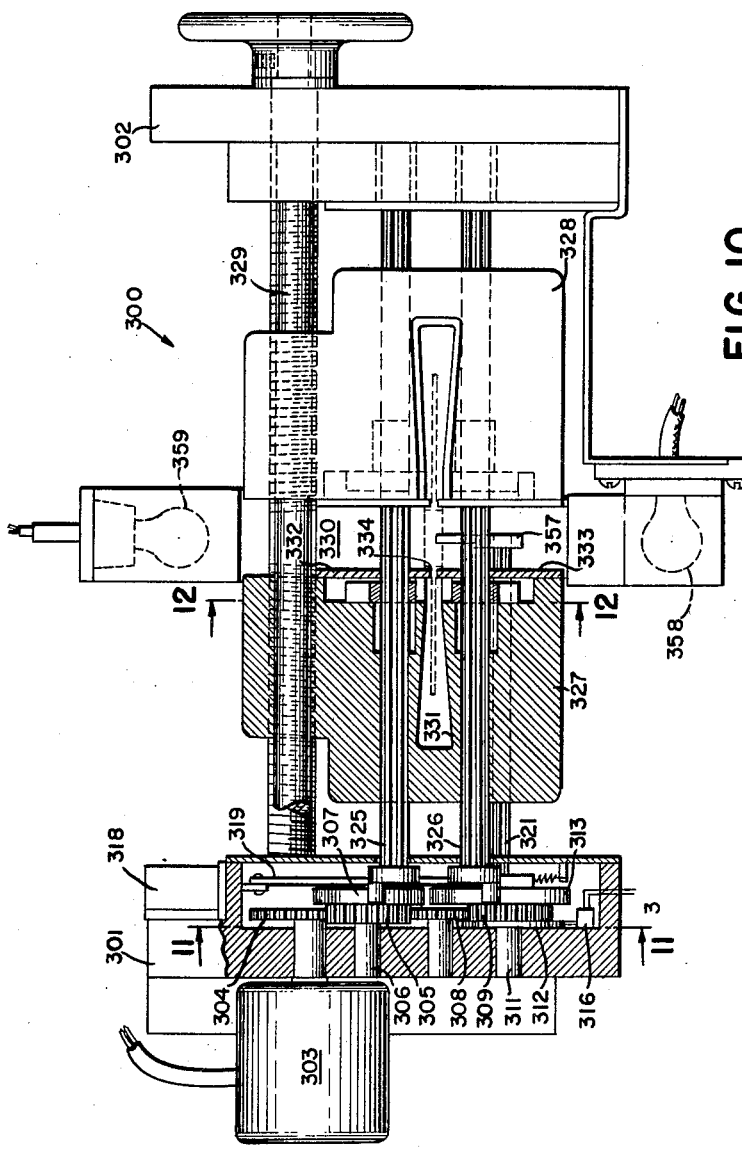
FIG. 10 is a plan view, with parts in section, of a jaw type orienter and tester.

An apparatus to meet the above requirements is that generally designated 300, and is shown in FIGS. 10 through 15. Referring now to FIG. 10, there may be seen a pair of side members 301 and 302, these members supporting a plurality of rods and shafts as will be discussed herein below. Adjacent to the side member 301 is a drive motor 303. Motor 303 drives a gear 304 (see also FIG. 11) which is in mesh with gear 305. Gear 305 is mounted upon a shaft 306 on which is also mounted a cam 307. Gear 305 drives an idler gear 308, which in turn drives a gear 309 mounted on the shaft 311. As is best seen in FIG. 10, the shaft 311 has a cam 312 thereon on one side of gear 309, and a cam 313 thereon on the other side of gear 309. The cam 312 is in juxtaposition with a switch 316, and serves to close it as will be herein below described.

Figure 11:
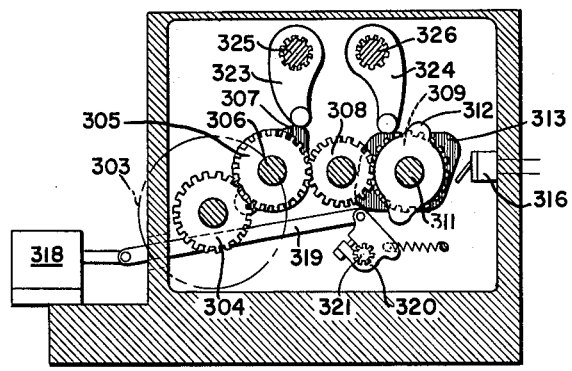
FIG. 11 is a cross-sectional view taken on line 11—11 of FIG. 10.
Figure 12:
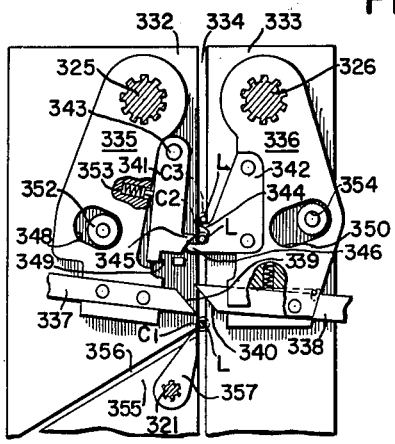
FIGS. 12 through 15 are cross-sectional views taken line 12—12 of FIG. 10, and showing the parts in different positions during an operating cycle.

There may also be seen in FIGS. 10 and 11 a solenoid 318 which is connected by a link 319 and a spring loaded clamp 320 to a gate-operating shaft 321.

The cams 307 and 313 have engaged with them the cam followers 323 and 324, respectively, these cam followers being on the two splined shafts 325 and 326. These shafts extend from the left side of the device 300, as shown in FIG. 10 to the side member 302 on the right side thereof, and extend through a pair of spaced housings 327 and 328. The housings 327 and 328 are carried by the adjusting shaft 329 which may vary the distance between the housings. The housings provide between them a passageway 330, which will be understood to be generally vertically extending, and the housings themselves are generally mirror images of each other, and so the below description will describe only one of the housings together with the parts pertinent to it, it being understood that the other housing has corresponding parts.

In the housing 327 is a generally vertically extending passageway 331 which is adapted to receive the lead of a component. On the face of housing 327 which is in opposed relation to housing 328 are a pair of horizontally spaced plates 332 and 333, these plates thereby providing a channel 334 between them through which the lead of the component extends, and which channel serves to guide the component in its downward passage through the device 300.

Referring now to FIGS. 12 through 15, there may be seen an escapement and contact mechanism for the components, it being understood that there are two such mechanisms as is indicated on FIG. 10. On the splined shafts 325 and 326 there are the arms 335 and 336. Arm 335 carries adjacent its lower end a contact jaw 337 having an upwardly facing bevel 339, and in similar fashion, the arm 336 carries at its lower end a contact jaw 338 having a downwardly facing bevel 340, jaw 338 being however, intermediately pivoted and spring-urged in a counter-clockwise direction.

A first escapement member 341 is pivoted to the housing 327 by a pin 343, being thereby positioned adjacent the first arm 335. The member 341 has a single nose 345 with an abutment 347 therebeneath. At its lower end, the member 341 also has an extension 349. The extension 349 is adapted to engage with a stop member 351, which may extend from housing 327, and a spring pin 353 housed in a bore in the first arm 335 tends to urge the first arm 335 and the first escapement member 341 away from each other.

Opposite the first escapement member 341 is a second escapement member 342 which has vertically spaced noses 344 and 346, the lower nose 346 being extended so as to engage the abutment 347 of the first escapement member 341 in certain positions thereof.

The arms 335 and 336 are provided with slots 348 and 350 respectively, through which extend spacers 352 and 354 which may extend from the housing 327.

Spaced from, and below the plate 332 is a plate 355, which thereby provides with the plate 332 a diverter channel 356. The passage of components either straight down the channel 334, or into the channel 356 is controlled by a gate 357 (see also FIG. 10) which is carried on the gate operating shaft 321 referred to above.

Referring again to FIG. 10, there may be seen provided on opposite sides of the passage 330 a light source 358 and a photo electric cell 359, these lying generally above the level of shafts 325 and 326.

In operation, the motor 303 will be energized and will thereby drive the gears 305, 308, and 309 to cause the cam followers 323 and 324 to periodically oscillate and to thereby oscillate the splined shafts 325 and 326. Assuming the parts in the position shown in FIG. 12, the first arm 335 is in its outer position, with the jaw 337 thereby withdrawn from its former position, and now not lying across the channel 334. As a consequence this has just released the lead L of a component C–1, which may be seen to be falling straight through the channel 334, undeflected by gate 357. At the same time, the second arm 336 is in its inner position, thereby carrying with it the second escapement member 342 into its inner position in which the noses 344 and 346 extend across the channel 334. The noses 344 and 346 thereby each hold the lead of a component, as shown, the nose 346 holding the lead L of a component C–2 and the nose 344 holding the lead L of a component C–3. Further, the nose 346 presses against the abutment 347 of the first escapement 341, thereby causing it to move against the urging of spring 353 into its outer position in which the nose 345 thereof is removed from the channel 334.

Figure 13:
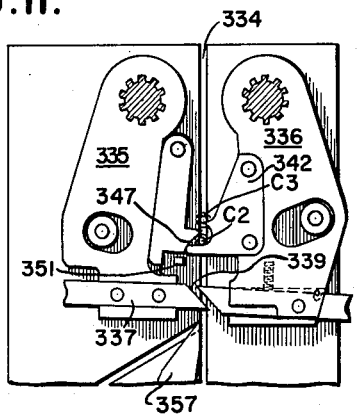

Having released the component which it was holding, the first arm 335 then moves to its inner position, as shown in FIG. 13, in which the contact jaw 337 has the upwardly facing bevel 339 thereof extending across the channel 334. The second arm 336 and the second escapement member 342 have not changed position between FIGS. 12 and 13. Consequently, the components C–2 and C–3 are still in the position shown in FIG. 12.

Figure 14:
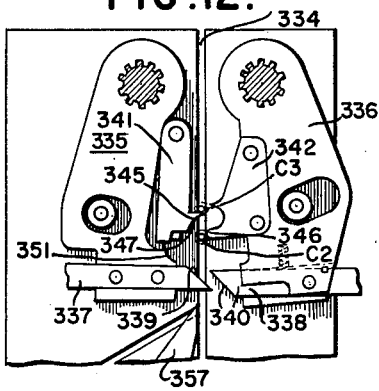

Thereafter, upon rotation of splined shaft 326, the second arm 336 will move to its outer position, as shown in FIG. 14, upon which action the contact jaw 338 will move to the outer position in which its bevel 340, and its entire inner end, do not overlie the channel 334. The nose 346 of the second escapement member 342 will be withdrawn from its inner position to its outer position, and will thereby permit the component C–2 to fall, and at the same time the nose 346 will no longer engage the abutment 347 of the first escapement member 341, so that consequently the spring 353 will urge the first escapement member 341 to its inner position, which is determined by the stop 351 against which the extension 349 moves. In its inner position, the escapement member 341 has its nose 345 lying across the channel 334, and it thereby engages beneath the lead of component C–3. Since the lead of component C–2 is no longer held by the nose 346 it will fall and come to rest against the upwardly facing bevel 339 of contact jaw 337.

Thereafter, the second arm 336 will move inwardly so that the lead of the component C–2 is engaged by the bevel 340 of the contact jaw 338, and so this lead is clamped or held between the contact jaws 337 and 338. Thus, both of the contact jaws 337 and 338 are in their inner positions in FIG. 15, while the second escapement member 342 is in its inner position and the first escapement member 341 has been moved to the outer position thereof by engagement of the nose 346, this latter action permitting the component C–3 to fall and have its lead held by the nose 346. The gate 357 is operated to either permit acceptable components to fall directly down channel 334, or to cause unacceptable components to enter diverter channel 356. Gate 357 as well as the other parts of the device 300 are controlled by suitable circuitry.

Figure 16:
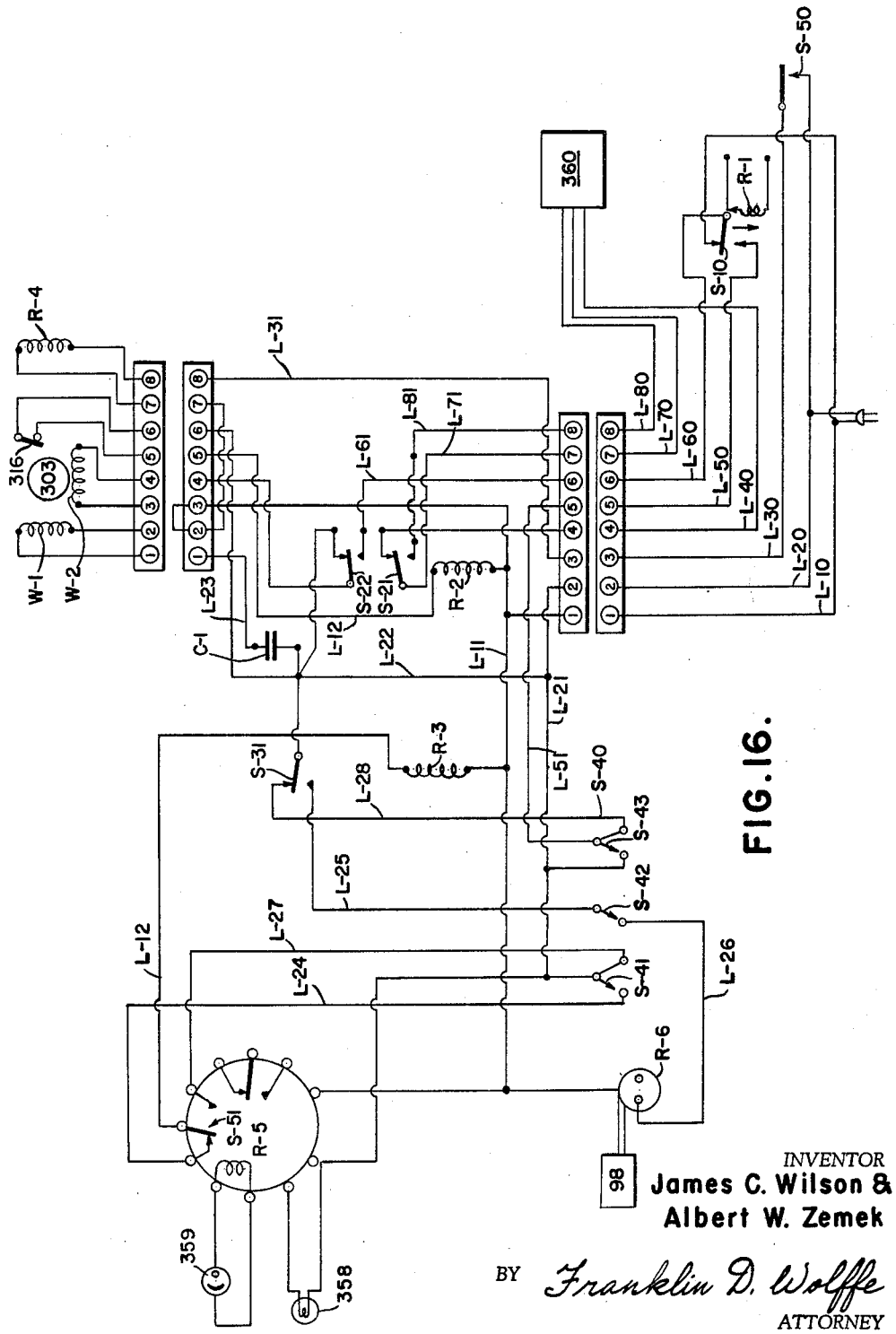
FIG. 16 is a diagram of a circuit useable with the jaw type tester of FIGS. 10–15.

A suitable circuit for use in conjunction with the jaw type tester and orienter 300 is shown in FIG. 16, wherein there may be seen the common line L–10 and the "hot" line L–20. A circuit is completed from L–20 through L–22, the previously mentioned cam actuated switch 316, L–12, the coil of relay R–2 and to L–10. This circuit thereby serves to energize the relay R–2 to change the positions of switches S–21 and S–22 from that shown. Upon the relay R–1 being energized, from the test circuitry, the switch S–10 will be moved from the position shown. There may thereby be completed a circuit from L–20 through L–21, switch S–43 of three pole double-throw switch S–40, L–51, L–50, switch S–19, L–60, L–61, switch S–22, winding W–2, and return or common lines L–11 and L–10. Since winding W–2 is a winding of the motor 303, the motor 303 will be energized, and will thereby rotate, since there has also been maintained a circuit through winding W–1 of motor 303, this circuit extending from L–20, L–21, L–22 through capacitor C–1 and L–23, through winding W–1 and back through common L–11. The motor 303 is a low inertia type, and as will be understood from the above the winding W–1 is always energized and the winding W–2 is intermittently energized, under the control of relay R–1 and relay R–2.

The motor 303 having been energized, it begins to rotate and after approximately 15° of rotation the switch 316 is opened. This breaks the circuit through relay R–2 and so the switch S–22 returns to the position shown. Since a circuit is completed, upon movement of switch S–22, from L–20 through L–21, L–22, switch S–22, winding W–2 and L–11 and L–10, there will be no interruption in the rotation of motor 303, inasmuch as winding W–2 will remain energized. Also, the relay R–1 is controlled, in part, by a time delay device, and will permit switch S–10 to return to the position shown after approximately one-tenth of a second. This time corresponds closely to the time required for motor 303 to rotate through 15°, to thereby open switch 316.

After motor 303 has rotated through 180°, switch 316 will be closed, and relay R–2 will again be energized, to thereby shift the position of switches S–21 and S–22. The only circuit which will then be completed through winding W–2 is one from L–10 to L–60, which is simply a grounded and unenergized circuit; otherwise stated, there is no circuit, in this position, from L–20 to L–10. Accordingly, the motor 303 will be thereby caused to stop at 180° of rotation.

Figure 15:
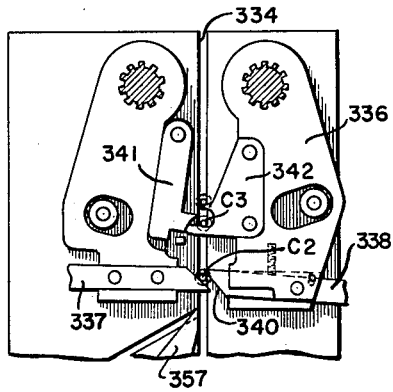

The relay R–2 being energized after 180° of rotation of motor 303, by the closing of switch 316, a circuit will be completed from L–70, through L–71 switch S–21 in the position opposite to that shown, L–81 and L–80. The lines L–70 and L–80 are connected with the test circuitry, generally designated 360. As will be understood, the contact jaws 337 and 338 are in their inner positions at this time, as is shown in FIG. 15, and so the component may be tested by the circuitry 360.

After the testing has been completed, the circuitry 360 energizes the relay R–1 to which it is connected, to thereby throw switch S–10 to begin a new cycle through the next 180° of rotation of motor 303.

In addition to the above described parts of the circuitry of FIG. 16, there is also completed a circuit from L–20 through L–21, switch S–41 of three pole double-throw switch S–40, L–24, switch S–51, L–12 and relay R–3 to L–11 and L–10. Relay R–3 will thereby be energized, and will accordingly move the switch S–31 to its alternate position to thereby complete a circuit from L–20 through L–22, switch S–31, L–25, switch S–42, L–26, relay R–6 and L–11 and L–10. The relay R–6 controls any device, and preferably includes a switch which is connected in the circuit of the driving motor 98 of a component supply device (not shown) which in this instance is the lead straightener 100. When the relay R–6 is energized, the circuit to the driving motor for the component supply device will be opened, to thereby stop or halt the action of the component supply device. Since the switch S–51 is under the control of a relay R–5 which is energized to cause switch S–51 to occupy the position shown when the photo-electric cell 359 is not illuminated from light source 358, it will be seen that when components are in the passage 330 they will block the light from light source 358 to photo-electric cell 359, thereby causing the relay R–5 to shift switch S–51 to the position shown. It will, therefore, provide for the halting of the component feed device when a sufficient number of components are in the passage 330, as sensed by the photo-electric cell 359. And when there are no components in the path between light source 358 and photo-electric cell 359, the switch S–51 will shift to its alternate position, to thereby break the circuit including relay R–3 which will in turn break the circuit to relay R–6, including the switch S–31.

It will thereby be understood that with the switch S–40 in the position shown, the component feeding device will be caused to operate and to feed components when there are no components in passage 330 which will block the light between light source 358 and the photo-electric cell 359, and conversely will be stopped when there are components in the passage 330.

In some instances, it may be desirable to stop the operation of the test circuitry 360, when the component feeding device is in continuous operation. Thus, it is possible that there will be a jamming up of components in the equipment, so that while components are being fed by the component feeding device, none are being received into passage 330. To provide for such a contingency, the switch S–40 is thrown to the other position. This will permit the operation of the motor 303 and the control circuits therefor in the manner above described. However, in the alternate position of switch S–40, and with the photo-electric cell 359 receiving light, a circuit will be completed from L–20 through L–21 switch S–41, L–27, switch S–51, L–12, relay R–3 and L–11 and L–10. Thereupon, a circuit will not be completed through relay R–6 since the circuit from L–20 through L–22 switch S–31 and L–25 will be broken at switch S–42. Consequently, the component feed device will be in operation and will continue to operate.

However, upon the photo-electric cell 359 being energized, the circuit from L–20 to L–50 will be open, since there can be no circuit from L–22 through S–31, L–28, switch S–43 to L–51 due to the switch S–51 not contacting with L–28.

On the other hand, with the photo-electric cell 359 not receiving light, due to the blockage of the light by components in passage 330, the circuit from L–20 and L–21 through switch S–41 and L–27 will be broken at switch S–51, and so no current will flow through relay R–3. Consequently, switch S–31 will remain in the position shown and the current will flow from L–20 through L–21, L–22, switch S–31, L–28, switch S–43 and into L–51 and L–50. With relay R–1 energized by the circuitry 360, a circuit will thereby be completed through the winding W–2. Hence, when the switch S–40 is thrown to the alternate position, a circuit may be completed through the winding W–2 only when the photo-electric cell 359 does not receive light from light source 358.

The switch S–50 is under the control of the test circuitry 360, and when a component is found to be of unsatisfactory quality, or is improperly oriented, the switch S–50 is closed to thereby complete a circuit from L–20 through switch S–50, L–30, L–31, relay R–4, and L–11 and L–10, to thereby energize relay R–4. The relay R–4 constitutes the coil of solenoid 318, which in turn controls the gate 357 to cause it to move to the position in which it will cause unacceptable components to enter diverter channel 356.

While only one unit 300 has been shown in the drawings, there may in practice be several such units assembled in vertical series, so as to enable one or more tests to be carried out in each unit. In the case of either a single or multiple unit arrangement, there may be provided a component rotating device 233, so that improperly oriented but acceptable components may be properly oriented.

*Universtal Taper and Strip Cutoff*

After components have been tested in the tester and orienter, they are lead into a machine for assembling them into a belt, the belt being made of the components and adhesive tapes along which the components are placed. In general, the two leads of the components are placed on two spaced tapes, and then two other tapes, overlying the first tapes, are applied to thereby hold each of the leads between two tapes.

Figure 17:
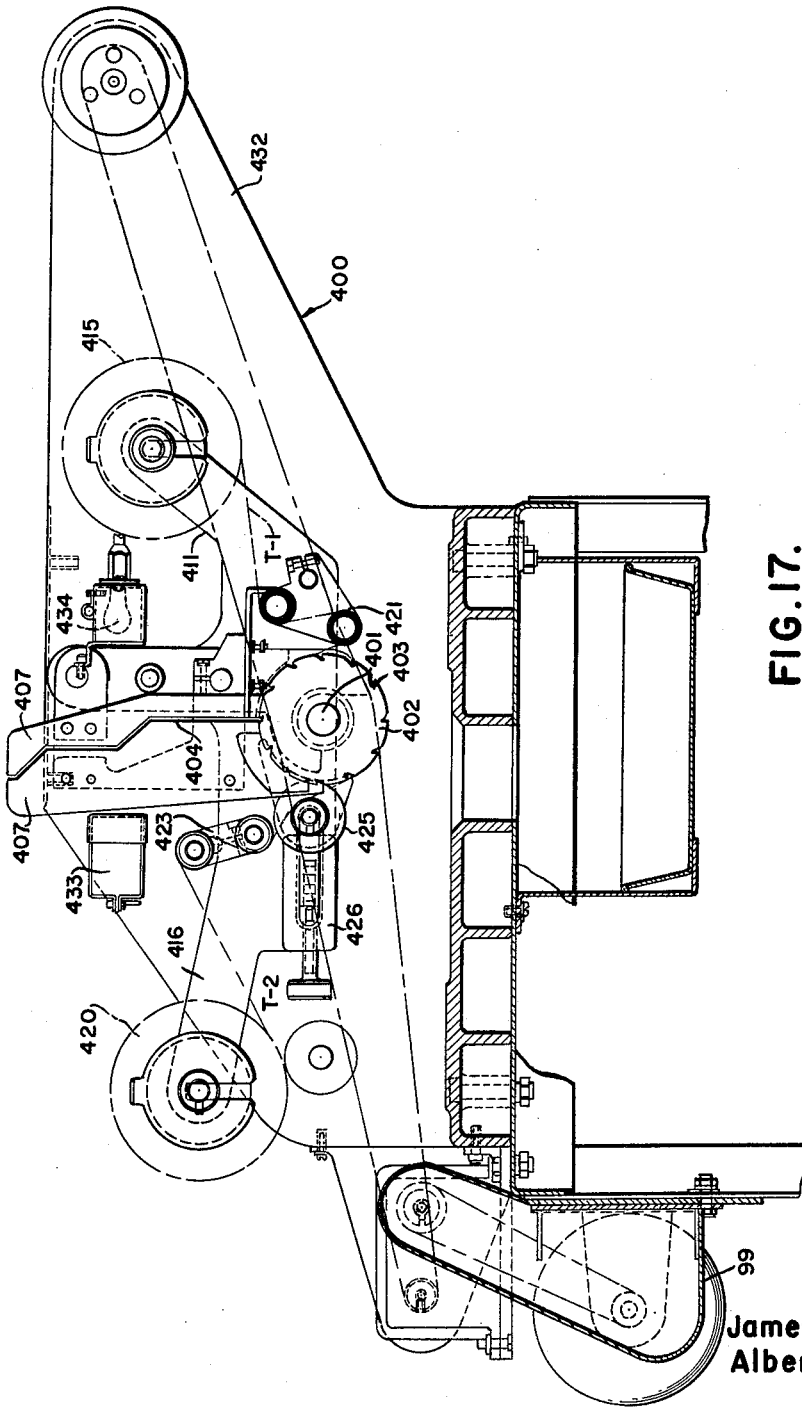
FIG. 17 is an elevational view of the taper forming part of the present invention.
Figure 18:
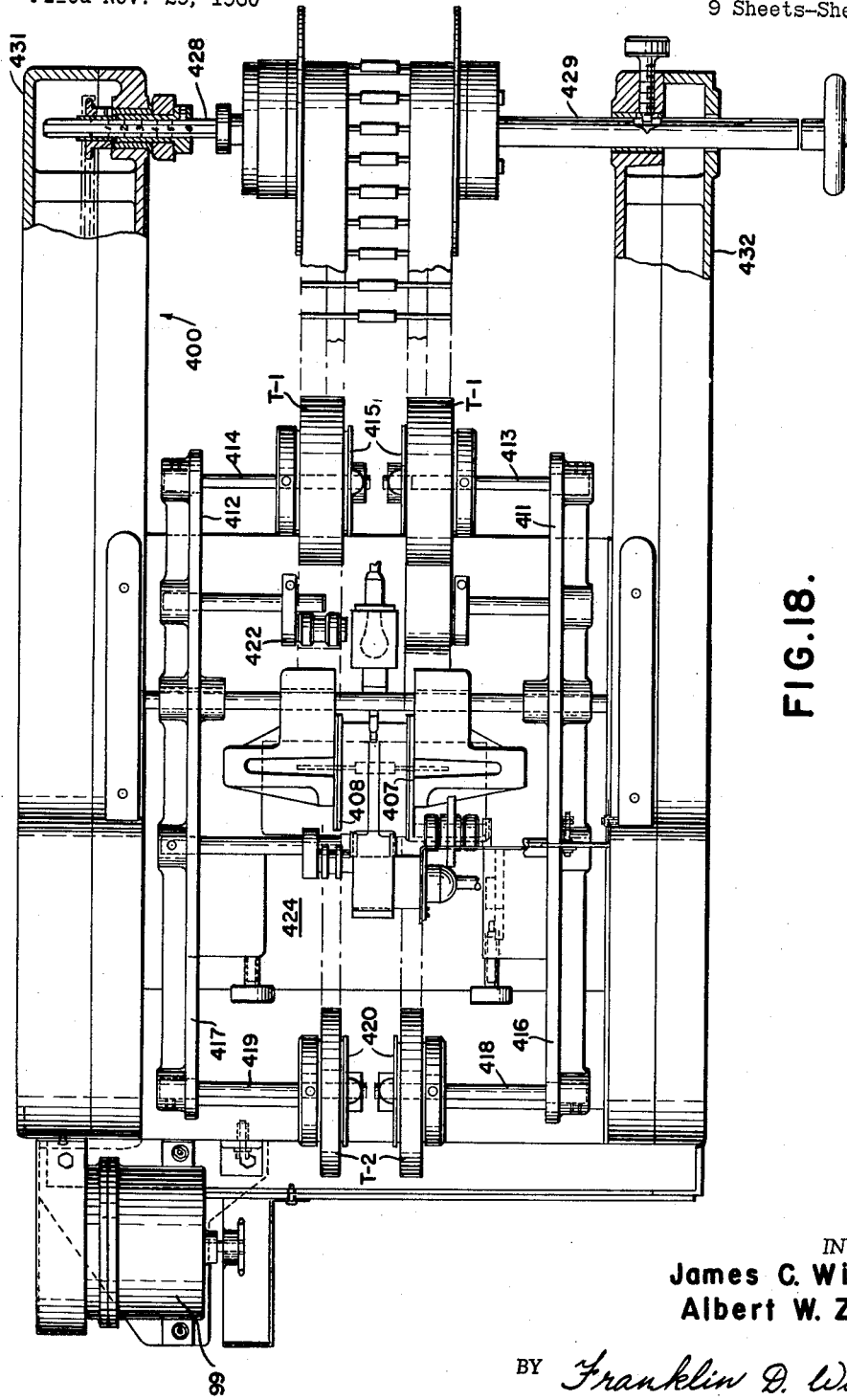
FIG. 18 is a plan view of the taper shown in FIG. 17.

Referring now to FIGS. 17 and 18, there may be seen a component taper comprising a shaft 401 having secured thereon a pair of spaced discs 402 which have notches 403 equally spaced about the peripheries thereof. One such disc is shown in FIG. 17, and it will be understood that the other disc of the pair is in parallel space relation to it. Electrical components are fed to the disc 402 by a passageway 404 formed in the split plates 407 and 408, both of which split plates may be seen in FIG. 18.

A pair of support arms 411 and 412 (see FIG. 18) each carries a spindle 413, 414 which serves to hold reels 415 on which are positioned the spaced adhesive tape rolls designated T–1. There may also be seen in FIG. 18 oppositely extending arms 416 and 417 carrying spindles 418 and 419 which support reels 420 having adhesive tape rolls T–2 thereon.

From the reels 415, the tapes T–1 are led over the rollers of a pair of roller supporting brackets, bracket 421 being shown in FIG. 17 and bracket 422 being shown in FIG. 18. From the rollers of these brackets 421 and 422, the tapes T–1 are led to the space adjacent the two discs 402, the adhesive side of these tapes facing upwardly and the tapes are carried in a counterclockwise direction, as seen in FIG. 17, with the discs 402. Similarly, tapes T–2 are fed from the reel 420 through the rollers of spaced brackets 423 and 424, and past pressure rollers 425, and a companion roller which is behind it in the FIG. 17 view, but which is not shown in the drawing. An adjustable resilient urging member 426 urges the pressure roller 425 against an underlying support carried by the discs 402 so that the tape T–2 is pressed against the tape T–1 and the electrical component leads supported thereby.

After the belt of tapes and components is thus formed, it is wound on a suitable reel carried by spindles 428 and 429 which are supported by arms 431 and 432.

In order to ensure that the components will be evenly and equally spaced along the belt, the rotation of shaft 410 is controlled by a motor driven chain and sprocket (not shown) which is in turn controlled from an electric eye 433 which receives light from a bulb 424 placed on the opposite side of the passageway 404 from it. Only when the electric eye 433 does not receive light beams from the light source 434 is the shaft 401 permitted to rotate; this ensures that there will always be a component available to fit in each of the notches 403 of the discs 402. This therefore ensures that each notch 403 will receive a component, and since the notches 403 are equally spaced about the periphery of the discs 402, it will be seen that the components will be equally spaced along the belt.

There has been provided a machine for processing axial lead components, including units for lead straightening, testing and orienting and taping. The lead straightener is readily adjustable, and has improved lead straightening characteristics, and is not susceptible to jamming. Further, the tester and orienter units operate rapidly and efficiently, the rotary unit enabling rapid testing and the jaw type unit permitting individual tests of components to proceed in accordance with the characteristics of that component.

It will be obvious to those skilled in the art that various changes may be made without departing from the spirit of the invention and therefore the invention is not limited to what is shown in the drawings and described in the specification but only as indicated in the appended claims.

What is claimed is:

1. Apparatus for testing axial lead electrical components comprising a pair of spaced housings, a pair of spaced, parallel, generally horizontal, shafts extending through said housings, a cam follower on each said shaft, means for actuating said cam followers to thereby effect oscillation of said shafts, first and second pairs of plates in horizontally spaced relation secured to opposed faces of said housings, each plate of each said pair of plates being spaced from each other to thereby provide a pair of spaced channels, first and second pairs of arms on said shafts adjacent said first and second pairs of plates, respectively, a first arm of each pair carrying a contact jaw having an upwardly facing bevel adapted to lie across a said channel in an inner position of said arm, a second arm of each pair carrying a contact jaw having a downwardly facing bevel adapted to lie across said channel in an inner position of said second arm, a first escapement member adjacent said first arm pivotally carried on a said housing and having a single nose adapted to lie across a said channel and above said jaws in an inner position thereof, said member having an abutment beneath said nose, spring means between and urging apart said member and said first arm, a stop on a said housing positioned to determine the inner position of said member, a second escapement member carried by said second arm and having a pair of noses, one of which is closely above and the other of which is spaced below said nose of said first member, said noses of said second member lying across said channel in the inner position thereof and said second mentioned nose of said second member engaging the abutment of said first member in the inner position of said second member and in said inner position holding said first member in an outer position in which the nose of said first member does not extend across said channel, means at the lower end of said channels for providing parallel diverter channels, and a shaft parallel to said first mentioned shafts having gate means thereon and associated with said last mentioned means.

2. Apparatus for testing axial lead electrical components comprising a housing, a pair of spaced, parallel, generally horizontal, shafts extending through said housing, a cam follower on each said shaft, means for actuating said cam followers to thereby effect oscillation of said shafts, plate means on said housing defining a channel, first and second arms on said shafts adjacent said channel, said first arm carrying a contact jaw having an upwardly facing bevel adapted to lie across said channel in an inner position of said arm, said second arm carrying a contact jaw having a downwardly facing bevel adapted to lie across said channel in an inner position of said second arm, a first escapement member adjacent said first arm pivotally carried on said housing and having a single nose adapted to lie across said channel and above said jaws in an inner position of said member, said member having an abutment beneath said nose, spring means between and urging apart said member and said first arm, a stop on said housing positioned to determine the inner position of said member, and a second escapement member carried by said second arm and having a pair of noses, one of which is closely above and the other of which is spaced below said nose of said first member, said noses of said second member lying across said channel in the inner position thereof and said second mentioned nose of said second member engaging the abutment of said first member in the inner position of said second member and in said inner position holding said first member in an outer position in which the nose of said first member does not extend across said channel.

3. Apparatus for testing axial lead electrical components comprising a housing, a pair of spaced, parallel, generally horizontal, shafts extending through said housing, means for oscillating said shafts, means defining a generally vertical channel through said housing, a first arm on one shaft carrying a contact jaw having an upwardly facing bevel adapted to lie across said channel in an inner position of said arm, a second arm on the other shaft carrying a contact jaw having a downwardly facing bevel adapted to lie across said channel in an inner position of said second arm, a first escapement member adjacent said first arm pivotally carried on said housing and having a single nose adapted to lie across said channel and above said jaws in an inner position of said member, said member having an abutment beneath said nose, spring means between and urging apart said member and said first arm, a stop on said housing positioned to determine the inner position of said member, and a second escapement member carried by said second arm and having a pair of noses, one of which is closely above and the other of which is spaced below said nose of said first member, said noses of said second member lying across said channel in the inner position thereof and said second mentioned nose of said second member engaging the abutment of said first member in the inner position of said second member and in said inner position holding said first member in an outer position in which the nose of said first member does not extend across said channel.

4. Apparatus for testing axial lead electrical components comprising a housing, a pair of spaced, parallel, generally horizontal shafts extending through said housing, means for oscillating said shafts, means defining a generally vertical channel through said housing, a first arm on one shaft carrying a contact jaw having an upwardly facing bevel adapted to lie across said channel in an inner position of said arm, a second arm on the other shaft carrying a contact jaw having a downwardly facing bevel adapted to lie across said channel in an inner position of said second arm, a first escapement member adjacent said first arm pivotally carried on a said housing and having a single nose adapted to lie across said channel and above said jaws in an inner position thereof, said member having an abutment beneath said nose, spring means urging said member towards its inner position, a stop on said housing positioned to determine the inner position of said member, and a second escapement member carried by said second arm and having a pair of noses, one of which is closely above and the other of which is spaced below said nose of said first member, said noses of said second member lying across said channel in the inner position thereof and said second mentioned nose of said second member engaging the abutment of said first member in the inner position of said second member and in said inner position holding said first member in an outer position in which the nose of said first member does not extend across said channel.

5. Apparatus for testing axial lead electrical components comprising a housing, a pair of spaced, parallel, generally horizontal shafts extending through said housing, means for oscillating said shafts, means defining a generally vertical channel through said housing between said shafts, a first arm on one shaft carrying a contact jaw having an upwardly facing bevel adapted to lie across said channel in an inner position of said arm, a second arm of each pair carrying a contact jaw having a downwardly facing bevel adapted to lie across said channel in an inner position of said second arm, a first escapement member adjacent said first arm pivotally carried on a said housing, and having a single nose adapted to lie across said channel and above said jaws in an inner position thereof, said member having an abutment beneath said nose, spring means urging said member towards its inner position, and a second escapement member carried by said second arm and having a pair of noses, one of which is closely above and the other of which is spaced below said nose of said first member, said noses of said second member lying across said channel in the inner position thereof and said second mentioned nose of said second member engaging the abutment of said first member in the inner position of said second member and in said inner position holding said first member in an outer position in which the nose of said first member does not extend across said channel.

6. Apparatus for use in testing double axial lead electrical components comprising means defining a pathway for said components, escapement means in juxtaposition with said pathway for permitting a single component at a time to pass therealong, and means beneath said escapement means for, in sequence, stopping, clamping and releasing the leads of a single component at a time.

7. The apparatus of claim 6, said last mentioned means comprising a first jaw having an upwardly facing bevel and a second jaw having a downwardly facing bevel.

8. Apparatus for testing axial lead electrical components comprising means defining a downwardly extending channel, a first movable arm on one side of said channel carrying a contact jaw having an upwardly facing bevel and a second movable arm on the other side of said channel carrying a contact jaw having a downwardly facing bevel, and means for moving said arms between inner and outer positions in which said bevels of said jaws respectively lie across said channel and are withdrawn therefrom, said bevels being in closely spaced relationship in the inner positions thereof, whereby said arms may be moved to inner positions to clamp a component lead between said bevels to permit testing of a component and may be moved to release the component lead.

9. Apparatus for testing axial lead electrical components comprising means defining a downwardly extending channel, a first movable arm on one side of said channel carrying a contact jaw having an upwardly facing bevel and a second movable arm on the other side of said channel carrying a contact jaw having a downwardly facing bevel, escapement means above said jaws for releasing components singly thereto, and means for moving said arms between inner and outer positions in which said bevels of said jaws respectively lie across said channel and are withdrawn therefrom, said bevels being in closely spaced relationship in the inner positions thereof, whereby said arms may be moved to inner positions to clamp a component lead between said bevels to permit testing of a component and may be moved to release the component lead.

10. Apparatus for testing axial lead electrical components comprising means defining a downwardly extending channel, a first movable arm on one side of said channel carrying a contact jaw having an upwardly facing bevel and a second movable arm on the other side of said channel carrying a contact jaw having a downwardly facing bevel, escapement means carried by said arms above said jaws for releasing components singly thereto, and means for moving said arms between inner and outer positions in which said bevels of said jaws respectively lie across said channel and are withdrawn therefrom, said bevels being in closely spaced relationship in the inner positions thereof, whereby said arms may be moved to inner positions to clamp a component lead between said bevels to permit testing of a component and may be moved to release the component lead.

11. Apparatus for testing axial lead electrical components comprising means defining a downwardly extending channel, first movable jaw means on one side of said channel having an upwardly facing bevel contact face, second movable jaw means on the other side of said channel having a downwardly facing bevel contact face, said jaw means being movable between inner positions in which said contact faces lie across said channel and are in facing relationship to each other and an outer position in which said contact faces are withdrawn from said channel, and means for moving said jaw means between said positions.

12. The apparatus of claim 11, and escapement means for releasing components singly to said jaw means.

13. In a machine for processing electrical components of the axial lead type, means for straightening the leads of an axial lead component, motor means for operating said straightening means, means for feeding components to said straightening means, means for testing components and for rejecting unsatisfactory components, automatic guide means for conducting components from said straightening means to said testing means, means for sensing the presence of components in said conducting means, means connected with said sensing means and said motor means for energizing said motor means when no components are sensed by said sensing means and for deenergizing said motor means when a component is sensed by said sensing means.

14. A machine in accordance with claim 13, and further comprising means for assembling satisfactory components including motor drive means therefor and automatic guide means for conducting satisfactory components from said testing means to said assembling means.

15. In a machine for processing electrical components of the axial lead type having a polarity characteristic comprising, in part, means for straightening and axially aligning the leads of an axial lead component, means for testing said components and rejecting unsatisfactory components; the improvement comprising test jaw means for clamping said leads and escapement means for permitting a single component at a time to escape said test jaw means.

16. A machine for processing electrical components of the axial lead type comprising; means for straightening and axially aligning the leads of axial lead components, and having a component guiding outlet portion, means for testing said components and for rejecting unsatisfactory components and having; a component guiding inlet portion, an unsatisfactory component guiding outlet portion, and a satisfactory component guiding outlet portion; said component guiding outlet portion of the straightening means and said component guiding inlet portion of the testing and rejecting means being adjacent and in abutting relation with each other with the guiding means of each being aligned to automatically transfer said component directly from the straightening means to said testing and rejecting means for accurate lead to lead testing.

17. A machine according to claim 16 including means for assembling satisfactory components and having a component guiding inlet portion, said satisfactory component guiding outlet portion of the testing and rejecting means and the component guiding inlet portion of the component assembly means being adjacent and abutting each other with the guiding means of each being aligned to automatically transfer components that have tested out satisfactorily directly from the testing and rejecting means to said component assembly means.

18. A machine according to claim 16 wherein; said electrical components have a polarity characteristic in which; said testing and rejecting means comprises, in part, means for testing said components for suitability and orientation, means for orienting all satisfactory components and guiding said satisfactory components into said satisfactory component outlet portion, and means for rejecting unsatisfactory components and guiding said unsatisfactory components into said unsatisfactory component guiding portion for discarding unsuitable components.

19. A machine according to claim 16 in which the testing and rejecting means comprises, in part, means for clamping the component leads during the testing of the components.

References Cited in the file of this patent

UNITED STATES PATENTS

| | | |
|---|---|---|
| 2,564,143 | Alsup | Aug. 14, 1951 |
| 2,752,039 | Woodell | June 26, 1956 |
| 2,859,871 | Harlow | Nov. 11, 1958 |
| 2,867,262 | Ainsworth | Jan. 6, 1959 |
| 2,878,841 | Peterson | Mar. 24, 1959 |
| 2,920,661 | Drukker | Jan. 12, 1960 |
| 2,975,878 | Cason | Mar. 21, 1961 |